(12) United States Patent
Rambler et al.

(10) Patent No.: US 10,769,389 B2
(45) Date of Patent: Sep. 8, 2020

(54) AUTOMATIC SCANNER CONFIGURATION

(71) Applicant: NCR Corporation, Duluth, GA (US)

(72) Inventors: Jason Rambler, Decatur, GA (US); Peter R. Charpentier, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 14/469,696

(22) Filed: Aug. 27, 2014

(65) Prior Publication Data

US 2016/0063285 A1 Mar. 3, 2016

(51) Int. Cl.
*G06K 7/016* (2006.01)
*G06Q 20/20* (2012.01)
*G07G 1/00* (2006.01)
*G06K 7/10* (2006.01)

(52) U.S. Cl.
CPC ......... *G06K 7/016* (2013.01); *G06K 7/10821* (2013.01); *G06K 7/10851* (2013.01); *G06Q 20/202* (2013.01); *G06Q 20/208* (2013.01); *G07G 1/0081* (2013.01)

(58) Field of Classification Search
CPC .................................................. G06K 7/10851
See application file for complete search history.

(56) References Cited

U.S. PATENT DOCUMENTS 5,109,484 A * 4/1992 Hughes ................ G06F 9/4411
709/222
5,777,315 A * 7/1998 Wilz ..................... G02B 26/106
235/375
6,616,049 B1 * 9/2003 Barkan ............... G06K 7/10851
235/383
7,725,890 B2 * 5/2010 Kawaura ................ G06K 15/00
717/168
8,626,593 B2    1/2014 Goldfinger et al.
2003/0018889 A1 * 1/2003 Burnett ............... H04L 41/0809
713/153
2005/0148326 A1 * 7/2005 Nogawa ............. H04L 41/0806
455/420
2006/0104265 A1 * 5/2006 Block .................... H04L 41/08
370/360

(Continued)

FOREIGN PATENT DOCUMENTS

CN       1759405      4/2006
EP       1614056      8/2014

OTHER PUBLICATIONS

European Search Report issued in co-pending European Application EP15181452.2 dated Dec. 22, 2015.

*Primary Examiner* — Thien M Le
*Assistant Examiner* — Asifa Habib
(74) *Attorney, Agent, or Firm* — Schwegman, Lundberg & Woessner

(57) ABSTRACT

Various embodiments each include at least one of systems, methods, firmware, and software to automatically configure a scanner, such as a scanner coupled to point-of-sale or self-service terminal. Some embodiments include initializing a scanner that is in an un-configured state and requesting scanner configuration settings from at least one device via a network, such as another scanner. Some embodiments further include receiving scanner configuration settings in response to the request and implementing the scanner configuration settings on the scanner.

17 Claims, 3 Drawing Sheets

(56) References Cited

U.S. PATENT DOCUMENTS

| | | | | |
|---|---|---|---|---|
| 2006/0261157 | A1* | 11/2006 | Ostrowski | A47F 9/047 |
| | | | | 235/383 |
| 2006/0289654 | A1* | 12/2006 | Robinson | G06K 7/10881 |
| | | | | 235/462.46 |
| 2007/0045424 | A1* | 3/2007 | Wang | H04W 40/246 |
| | | | | 235/462.46 |
| 2007/0046467 | A1* | 3/2007 | Chakraborty | G06K 7/0008 |
| | | | | 340/572.1 |
| 2008/0093456 | A1* | 4/2008 | Pasik | G06K 17/0022 |
| | | | | 235/454 |
| 2008/0121715 | A1* | 5/2008 | Field | G06K 7/10851 |
| | | | | 235/462.25 |
| 2008/0230607 | A1* | 9/2008 | Etten | G06K 17/0022 |
| | | | | 235/435 |
| 2009/0108067 | A1 | 4/2009 | Roquemore | |
| 2010/0054154 | A1* | 3/2010 | Lambert | H04L 41/0886 |
| | | | | 370/254 |
| 2010/0281474 | A1* | 11/2010 | Eason | G06F 8/61 |
| | | | | 717/172 |
| 2014/0106727 | A1* | 4/2014 | Velusamy | H04W 4/50 |
| | | | | 455/418 |
| 2014/0207973 | A1* | 7/2014 | Robertson | G06F 9/4411 |
| | | | | 710/8 |
| 2014/0372514 | A1* | 12/2014 | Doui | G06F 3/1239 |
| | | | | 709/203 |
| 2016/0055338 | A1* | 2/2016 | Jeansonne | G06F 3/0688 |
| | | | | 713/2 |
| 2017/0109104 | A1* | 4/2017 | Dahlberg | G06F 3/1209 |
| 2017/0311055 | A1* | 10/2017 | Faroe | H04Q 9/00 |

* cited by examiner

AUTOMATIC SCANNER CONFIGURATION

BACKGROUND INFORMATION

Point-Of-Sale (POS) devices and self-service terminals (SSTs) often include scanners, such as bi-optic scanners, that are used to scan barcodes affixed to products. Scanners may include one or more of a laser and a camera scanner in addition to other devices integrated therein, such as scales to weigh products and lights to illuminate one or more scanning fields. Scanners themselves may also include a variety of configuration options that influence their operation. Such configuration options may include types or styles of barcodes or other symbologies to scan, sound and visual output signals and triggers therefore such as when a product is successfully or unsuccessfully scanned, communication protocols used to communicate with a POS, SST, or other terminal, and a firmware version to execute, among others. Thus, when a scanner is installed or replaced, the scanner needs to be configured.

Scanners to date have been manually configured directly by a technician. This configuration may be performed by scanning, with the scanner, a series of barcodes encoded with information to set these configurations. The configuration may also be set through manipulation of jumper switches, through another device directly coupled to the scanner, or by other means where a technician directly manipulates the scanner on premises. Deploying and replacing scanners therefore involves more manual effort than simple physical installation and typically requires efforts of trained personnel.

SUMMARY

In various embodiments, methods and a scanner device for automatic product scanner configuration are provided.

According to an embodiment, a method for automatic scanner configuring is provided. One embodiment of such a method includes initializing a scanner that is in an unconfigured state and requesting scanner configuration settings from at least one device via a network, such as another scanner. The method further includes receiving scanner configuration settings in response to the request and implementing the scanner configuration settings on the scanner.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
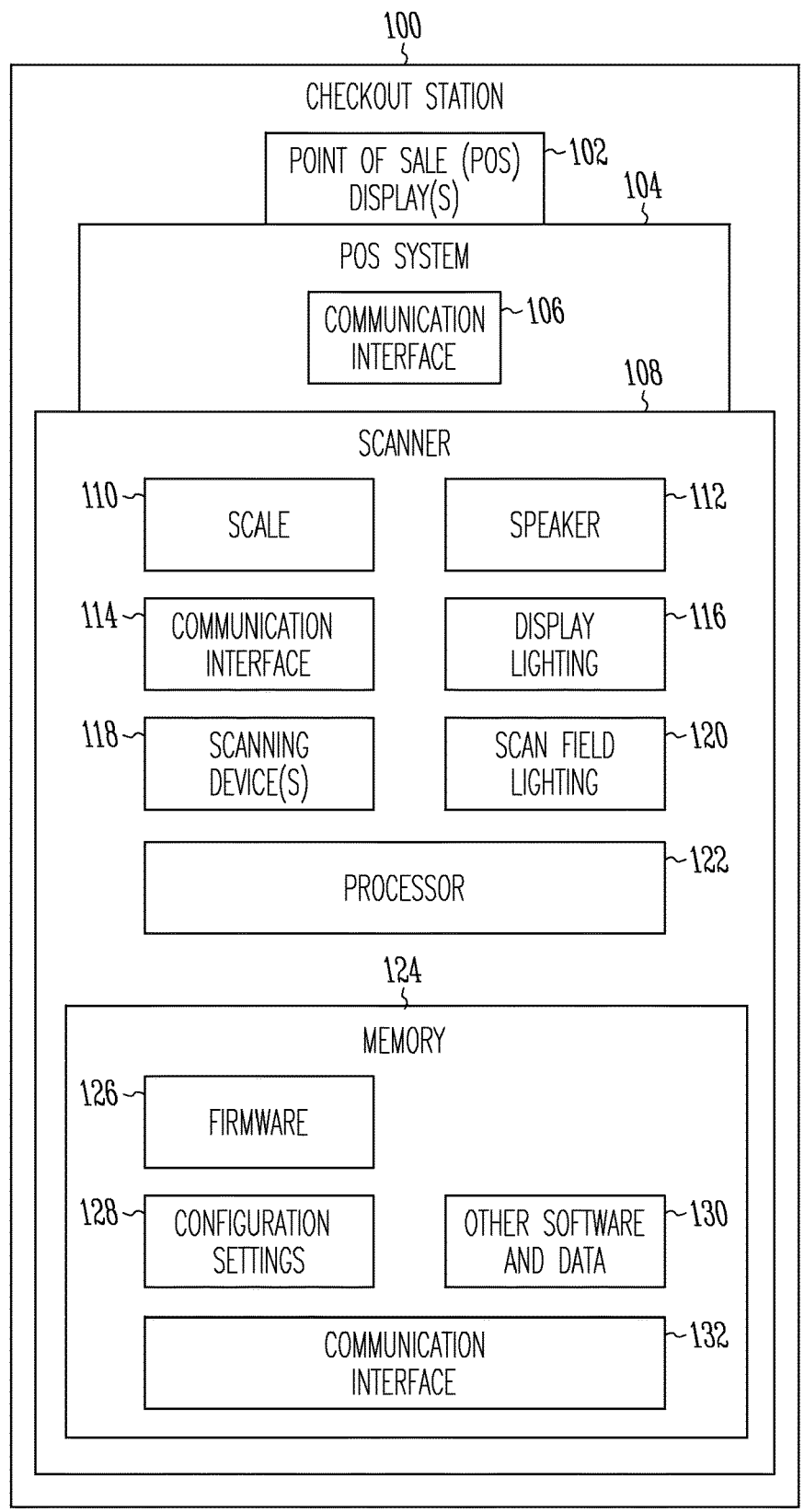
FIG. 1 is a diagram illustrating components of a checkout station having a scanner, according to an example embodiment.

FIG. 1 is a diagram illustrating components of a checkout station 100 having a scanner 108, according to an example embodiment. It is to be noted that the checkout station 100 is shown schematically in greatly simplified form, with example components relevant to understanding various embodiments herein. The same situation may be true for the other various components of the checkout station 100. Note that the checkout station 100 may include more or fewer components in some embodiments.

Furthermore, the various components included in the FIG. 1 as illustrated and arranged are provided for illustration purposes only. It is to be noted that other arrangements with more or fewer components are possible without departing from the contributions herein, in particular with regard to automatic and remote scanner configuration.

Moreover, the methods and scanner presented herein and below may include all or some combination of the components shown in the context of the checkout station 100. Further, although a checkout station 100 is illustrated as including a scanner 108, the scanner 108 may be a stand-alone element or an element of other systems, devices, and terminals in other embodiment. Examples of other terminal-types that may include a scanner 108 are self-service terminals (SSTs), clerk operated and self-service library checkout stations, time-keeping terminals, and the like.

The methods of some embodiments are programmed as executable instructions in memory and/or non-transitory computer-readable storage media and executed on one or more processors associated with the components and devices herein.

The checkout station 100 includes one or more POS displays 102 that present information of a POS system 104 coupled to the one or more POS displays. Information presented by the one or more POS displays includes information relevant in a retail context and with regard to operation of the checkout station. The checkout station 100 also includes the scanner 108.

The scanner 108 may be referred to as a bar code scanner as that is the task most commonly associated with such devices. During operation of the checkout station 100, items are placed within a scan field of the scanner 108. One or more scanning devices 118 of the scanner 108, such as one or more of a camera and a laser scanner then scan a barcode and information read therefrom is communicated to the POS system 104. The POS system 104 then uses that data to identify the item placed within the scan field of the scanner 108 and performs an additional function. The additional function may include a price lookup and addition of the item to a list of items to be purchased, which may be presented on the one or more POS displays 102.

The scanner 108 may include one or more scan fields, such as two scan fields of bi-optic scanners that are commonly seen in grocery and discount retail outlets. In addition to the scanning devices 118, the scanner 108 may include various other components. The various other components may include an integrated scale 110 such as may be used in a grocery outlet to weigh produce and one or both of a speaker 112 and display lighting 116 to output audio a visual signals such as signals of (un)successful scans. The scanner 108 may also include scan field lighting 120 that may be turned on and off and adjusted based on a detected presence of an item to be scanned.

During typical operation, the scanner 108 is operated according to instructions executed on a processor 122. The processor may be an application integrated circuit (ASIC), digital signal processor, microprocessor, or other type of processor. The instructions may be firmware 126 or software 130 stored in one or more memories 124. The one or more memories 124 may be or include volatile and non-volatile memories, write-protected memories, write-once memories, random access memory (RAM), read only memories (ROM), and other memory and data storage types and devices.

The instructions as may be stored in firmware 126 or as software 130 in memory 124 are executed according configuration settings stored in the memory 124. The configuration settings 128 configure operation of the scanner 108 and the various components therein. For example, the configuration settings 108 may configure speaker 112 volume, display lighting 116 outputs, scan field lighting 120 brightness, decoding algorithm of the scanning device(s) 118 and the instructions, one or more communication protocols used to communicate data from the scanner 108 to the POS system 106, such as via a wired or wireless communication interface 106 of the POS system 106, scale 110 operating parameters (e.g., unit of measure as pounds or kilograms), among other configuration settings the particular scanner 108 of an embodiment may include. In some embodiments, the configuration settings 128 may include a firmware version, a software version, and the like. Thus, when a configuration is set or updated, the setting or updating of the configuration settings 128 may include population and updates of any of the configuration settings 128 of a particular embodiment, including an update to firmware and software present on the scanner.

As discussed in the Background section above, configuration settings have previously been set through direct interaction with the scanner 108. For example, such direct interacting with the scanner has included scanning a series of barcodes with the scanner 108 where the barcodes are encoded with information to set configuration settings 128. Such interacting with the scanner has also included manipulation of jumper switches, interaction through another device directly coupled to the scanner 108, or by other means where a technician directly manipulates the scanner on premises. Deploying and replacing scanners therefore has involved more manual effort than simple physical installation and has typically required efforts of trained personnel.

Various embodiments herein provide solutions whereby the configuration settings 128 may be set automatically. Some of these embodiments and others also or alternatively provide solutions that allow remote manipulation of the configuration settings 128, such as over a network. The network may be a store-based network that may or may not be connected to one or both of a corporate network, the Internet, and other networks. In all of these solutions, the scanner 108 is able to communicate over one or more of these networks via a communication interface 114 that is integrated within the scanner 108 or a communication interface 106 of the POS system 104 that may be accessed by firmware 126 or software 130 of the scanner 108 via a communication connection between the scanner 108 and the POS system 104. In some embodiments, the communication interface 106 of the POS system 104 is accessible from the scanner 108 as a virtualized communication interface 132 as may be maintained in the memory 124 by a process that executes on the processor. Each of the communication interfaces 106, 114 may be wired or wireless communication interface devices, such as a wired Ethernet device, a wireless Ethernet device (e.g., a device capable of communicating according to one or more of the 802.11 standards), Bluetooth® device, a mesh network device or other peer-to-peer type networking device, a mobile network data communication device, and the like.

In some embodiments, the software 130 stored in memory 124 includes instructions executable on the processor 122 to automatically set the configuration settings 128, such as upon scanner 108 installation, completion of scanner 108 maintenance, or other times with regard to the scanner 108. In some embodiments, when the scanner 108 is powered on after being installed, replaced, or when otherwise in an un-configured, firmware 126 or other software 130 of the scanner 108 identifies the un-configured state, such as by identifying that one or more configuration settings 128 are missing or set to certain values that indicate a need to be set. A configuration process may then be triggered. The configuration process may be a firmware 126 or software 130 process.

In some embodiments, the configuration process is executed by the processor 122 to retrieve configuration settings over a network via the connection interface 114 of the scanner 108, when present, or via the communication interface 106 of the POS system 104. In some embodiments, the configuration settings may be retrieved from a fixed network data storage location, such as a server that may be present in a store or other facility where the checkout station 100 is located. In other embodiments, the fixed network data storage location may be a remote data storage location on a corporate network remote to a location where the checkout station 100 is located. In yet further embodiments, the fixed network data storage location from which configuration settings may be retrieved is a data storage location accessible via the Internet. Additionally, some embodiments may include retrieving one or more configuration settings from each of two or more of these various data storage locations. Regardless, the data storage location from which configuration settings may be retrieved may be identified in a configuration setting 128 previously stored in the memory 124 or may be provided by an installer of the scanner 108.

In other embodiments, the scanner 108 configuration process may obtain configuration settings from one or more other scanners present on a network to which the scanner 108 is connected. The scanner 108 configuration process obtains the configuration settings from the one or more other scanners 108 via the integrated communication interface 114, when present, or communication interface 106 of the POS system 104.

In some embodiments, a group of scanners deployed on a network may be configured identically. In some of these embodiments, there may be two or more groups of scanners where each group is deployed for a specific type of checkout station (e.g., teller assisted checkout station group, self-service checkout station group, gift registry creation kiosk group, aisle-deployed price check kiosk group, etc.).

In some embodiments, one scanner of the group, or one scanner of each group, is designated as a master. In some embodiments, the scanner 108 configuration process executes to determine if there is a defined master, such as by polling scanners on the network to locate the master. In other embodiments, the scanner 108 configuration process may assume there is a master and poll scanners on the network to locate the master.

In some embodiments, the scanner 108 configuration process may poll the other scanners with data identifying its group. The data identifying the group may be defined in the configuration settings 128, determined by the configuration process based on the presence of the POS system 104 within the checkout system 100, other properties of a system to which the scanner 108 is attached, and components present in the scanner 108.

In other embodiments, when polling other scanners, the scanner 108 configuration process may include data representative of properties of one or more of the checkout station 100, POS system 106, and components present in or otherwise coupled to the scanner 108. When another scanner receives the polling from the scanner 108, the other scanner may simply reply with information indicating it is not a master, not the master of the right group, or with data representative of configuration settings 128 for the scanner 108 that the configuration process will store in the memory 124. In some embodiments, when another scanner is polled and replies with an indication that it is not the master or the master of the right group, the reply may include data identifying the master. In such embodiments, the scanner 108 configuration process may then request the configuration settings from that particular scanner.

In another embodiment, the scanner 108 configuration process may simply request configuration settings from any scanner on the same network, such as a store or dedicated checkout station network.

In one embodiment, the scanner 108 configuration process may request configuration settings from all scanners on a network, from all scanners in a group, or all scanners have certain properties. In response, the scanner 108 configuration process receives configuration settings from the other scanners implicated by the request. The scanner 108 configuration process may then evaluate the received configuration settings to identify the most common settings, settings specific to components that are also present in the scanner 108 or checkout station 100, or based on other criteria. The identified configuration settings 128 are then stored to the memory 124.

Regardless of how the configuration settings 128 are retrieved, received, or determined, the configuration process then implements the configuration settings 128 on the scanner 108. In various embodiments, implementing the configuration settings 128 may require a restart of one or more of the scanner 108, the POS system 104, and the checkout station 100.

In some of these embodiments where a software 130 configuration process automatically retrieves, receives, or determines it configuration settings 128 and other embodiments, the software 130 may also include an interface through which the configuration settings 128 can be manipulated remotely. In some such embodiments, the software 130 provides a browser-based user interface that is accessible via a network. The browser-based user interface may include security to prevent unauthorized access. The browser based user interface also typically includes a set of web pages that can be navigated and manipulated to set the various configuration settings 128.

In other embodiments, the interface is a data interface that receives data requests for data representative of the current configuration settings 128 and update requests are received to update the configuration settings 128. The data interface of such embodiments may be accessed by administrators via apps or applications, either directly or indirectly via server-based processes.

Figure 2:
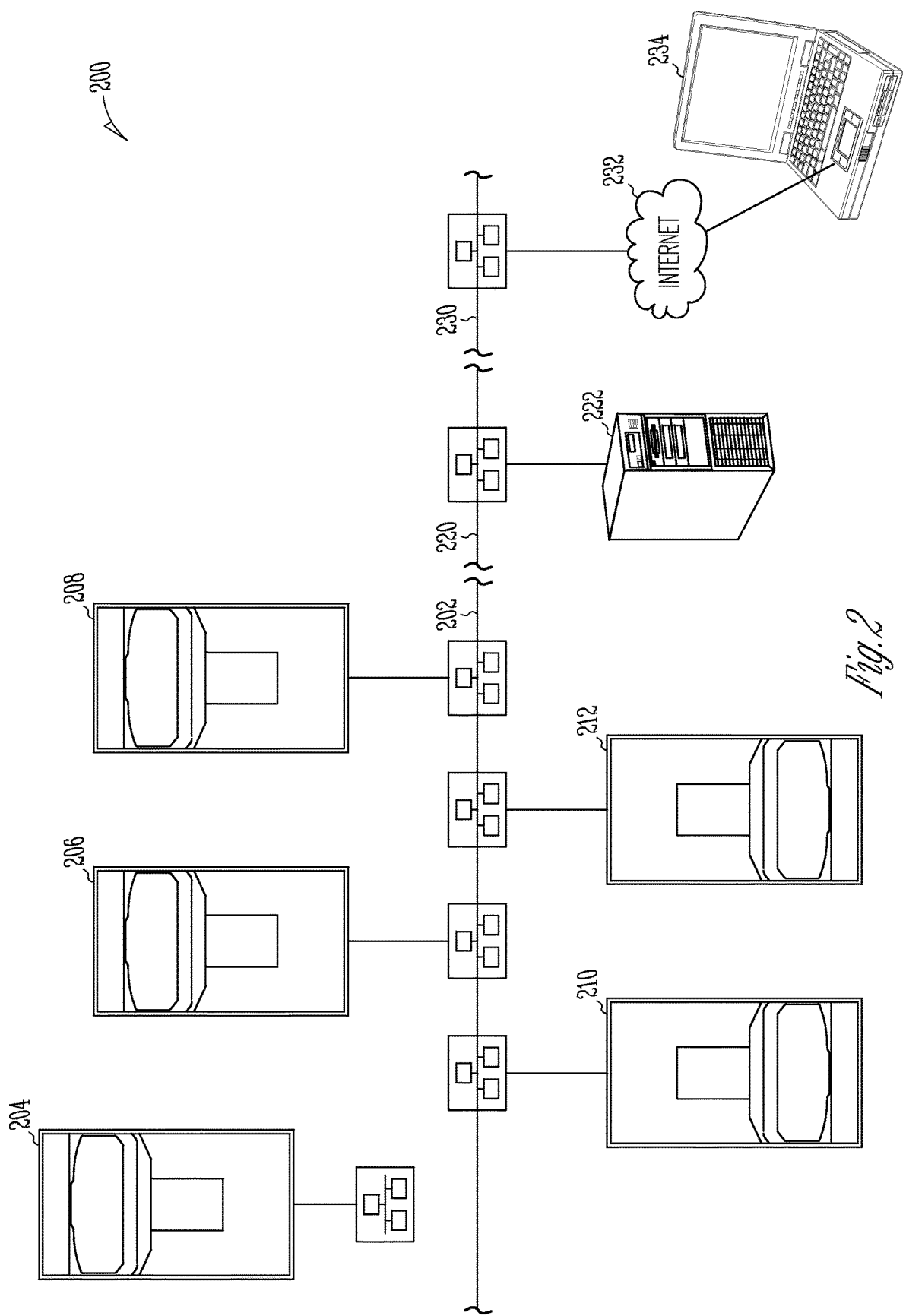
FIG. 2 is block diagram of networked system components, according an example embodiment.

FIG. 2 is block diagram of networked system 200 components, according an example embodiment. The networked system 200 is a view of a networked system including scanners 206, 208, 210, 212 connected to a network segment 202. The network segment 202 may be a stand-alone network, such as a network within a retail outlet. The network segment 202 may also be part of a larger network that includes additional network segments 220, 230. For example, the network segment 202 may be a store-based network that is also coupled a corporate network segment 220. The corporate network segment 220 may further be coupled to an internet 232 network segment 230.

The network segment 202 includes the plurality of scanners 206, 208, 210, 212 connected thereto. Although not illustrated, the scanners 206, 208, 210, 212 are each also typically coupled to terminals, such a POS terminals, self-service kiosks, and the other types of terminals discussed elsewhere herein. The system 200 also includes a scanner 204 that has not yet been connected to the network segment 202. Once the scanner 204 is connected to the network segment 202, a configuration process will execute within the scanner to automatically set its configuration. This may include discovering its configuration through communication with one or more of the other scanners 206, 208, 210, 212, requesting configuration setting data from a server 222 that may be accessible via the network segment 202, the corporate segment network 220, or the Internet 232 network segment 230. Further, the configuration settings may also be pushed to, or otherwise remotely set to, the scanner 204 or to other scanners 206, 208, 210, 212 from the server or from a computing device 234 that may be connected to the Internet 234, the corporate network segment 220, or the network segment 202 via an interface of the scanners 204, 206, 208, 210, 212 as discussed above.

Figure 3:
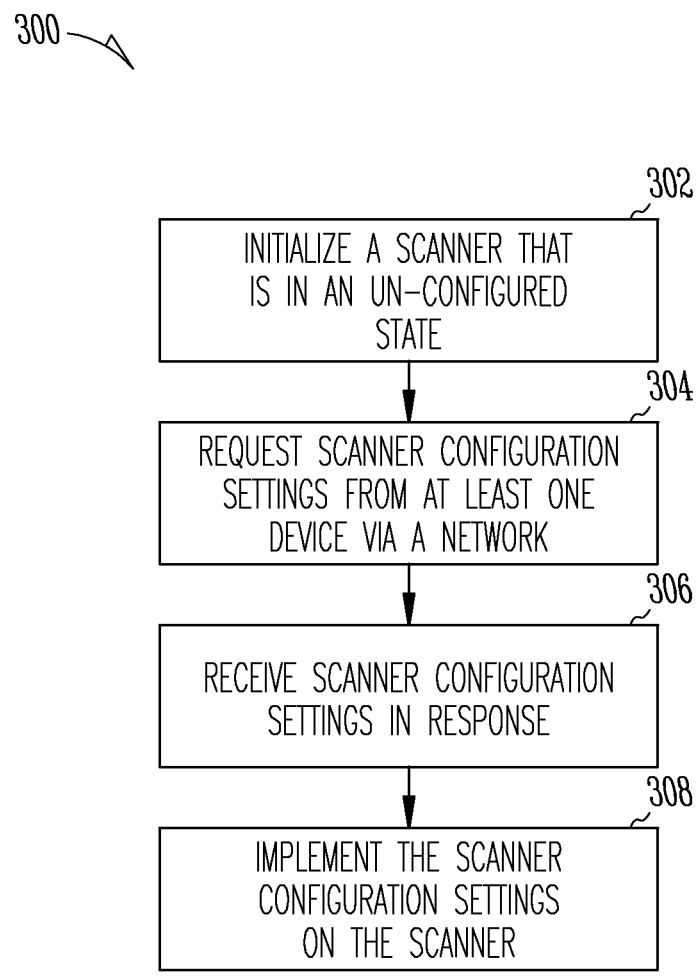
FIG. 3 is a block flow diagram of a method, according to an example embodiment.

FIG. 3 is a block flow diagram of a method 300, according to an example embodiment. The method 300 is an example of a method that may be performed by a scanner, such as scanner 108 of FIG. 1, according to some embodiments.

The method 300 includes initializing 302 a scanner that is in an un-configured state and requesting 304 scanner configuration settings from at least one device via a network. In some embodiments, the method 300 may determine the scanner is in an un-configured state simply by attempting to read configurations settings from a memory as part of an initialization process and discovering there are no stored configuration settings, one or more but fewer than all configuration settings are not stored, or one or more stored configuration settings indicate the scanner is un-initialed.

In response to requesting 304 the scanner configuration settings, the method 300 further includes receiving 306 scanner configuration settings in response to the request 304. The method 300 may then implement 308 the scanner configuration settings on the scanner. The implementing may include storing the configuration settings to a scanner memory device and restarting the scanner. The received configuration settings may include firmware and software updates and settings such as whether a scale component of the scanner will output weight measurements in pounds, kilograms, or other unit(s) of measure.

In some embodiments of the method 300, requesting 304 scanner configuration settings from at least one device includes polling scanners connected to the network to identify a master scanner and upon identification of the master scanner, requesting the scanner configuration settings from the master scanner. In some such embodiments, polling scanners connected to the network to identify the master scanner includes transmitting data to another scanner connected to the network. The transmitted data may include data indicating the polling is a request to identify a master scanner of a scanner group based on other data included in the transmitted data. The other data included in the transmitted data may include data representative of at least one property of the scanner, components present in the scanner, and a system to which the scanner is coupled.

In other embodiments of the method 300 the at least one device from which the scanner configuration settings are requested 304 is a server that stores or has access to data representative of at least one configuration setting.

In another embodiment of the method 300, requesting 304 scanner configuration settings from at least one device includes requesting data representative of scanner configuration settings from a plurality of other scanners. In this embodiment of the method 300, receiving 306 the scanner configuration settings includes receiving data representative of configuration settings from at least two of the plurality of other scanners. The received data representative of the configuration settings is then analyzed to determine the configuration settings for the scanner. The analyzing of the received data may include identifying the most common of each configuration setting. Other analysis techniques may be performed, such as when the received data also includes data representative of properties of the scanners from which the data was received that can be compared to the scanner to determine configuration settings that are most appropriate for the scanner.

Another embodiment is in the form of a scanner. A scanner of this embodiment includes a communication interface device, such as a wired or wireless Ethernet device. The scanner also includes at least one configurable component, such as one or more scanning devices, a scale, a speaker, display lighting, and lighting for one or more scan fields of the scanner. The scanner also includes a data processing device and at least one memory device. However, in some embodiments, the data processing device and a memory may be a single device, such as a firmware device.

Configuration settings are stored on the at least one memory device as well as instructions executable by the at least one data processing device to control all or a portion of the scanner. In some embodiments, the instructions are executable to determine, during a scanner initialization process, that the configuration settings are to be updated in the at least one memory device. The instructions are further executable to request and receive scanner configuration settings from at least one device via the communication interface device. The received scanner configuration settings are stored on the at least one memory device. The instructions are also executable to implement the scanner configuration settings, such as by restarting the scanner initialization process or the scanner.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    initializing, upon powering on, a scanner that is in an un-configured state, including sensing, by the scanner polling another device, when the scanner is connected to a network and determining that the scanner is in the un-configured state based on a value or state of one or more configuration settings missing from the scanner indicating the scanner has not been initialized; and
    in response to the determining that the scanner is in the un-configured state:
        requesting, by the scanner, scanner configuration settings from at least two other scanners via a network;
        receiving, by the scanner, scanner configuration settings in response including receiving data representative of configuration settings from the at least two of other scanners;
        analyzing, by the scanner, the received data representative of configuration settings to determine the configuration settings for the scanner; and
        implementing the scanner configuration settings on the scanner of the initializing.

2. The method of claim 1, wherein requesting scanner configuration settings from at least one device includes:
    polling scanners connected to the network to identify a master scanner; and
    upon identification of the master scanner, requesting the scanner configuration settings from the master scanner.

3. The method of claim 2, wherein polling scanners connected to the network to identify the master scanner includes:
    transmitting data to another scanner connected to the network, the transmitted data including data indicating the polling is a request to identify a master scanner of a scanner group based on other data included in the transmitted data, the other data including data representative of at least one property of the scanner, components present in the scanner, and a system to which the scanner is coupled.

4. The method of claim 1, wherein the at least one device from which the scanner configuration settings are requested is a server that stores or has access to data representative of at least one configuration setting.

5. The method of claim 1, wherein receiving scanner configuration settings includes receiving a firmware or software update.

6. The method of claim 1, wherein implementing the scanner configuration settings on the scanner includes storing the configuration settings in a memory of the scanner.

7. The method of claim 1, wherein requesting scanner configuration settings from at least one device via the network includes transmitting the request to one scanner connected to the network.

8. The method of claim 1, wherein the method is performed:
by and on hardware integrated within the scanner; and
automatically during an initialization of the scanner.

9. A method comprising:
reading configuration settings from a memory device during initialization of a scanner in response to connection of the scanner to a network;
determining, by the scanner, new configuration settings need to be obtained based on a value or state of one or more missing configuration settings of the scanner expressly indicating the scanner has not been configured; and
in response to the determining that the scanner is in the un-configured state:
requesting, via a network interface device of the scanner, configuration settings from at least two other scanners;
receiving, via the network interface device of the scanner, data representative of configuration settings from the at least other scanners;
analyzing, by the scanner, the received data representative of configuration settings to determine the configuration settings for the scanner;
updating configuration settings stored in a memory of the scanner;
restarting the scanner; and
initializing the scanner based on the updated configuration settings stored in the memory of the scanner.

10. The method of claim 9, wherein requesting scanner configuration settings from at least one other scanner includes:
polling scanners connected to the network to identify a master scanner; and
upon identification of the master scanner, requesting the scanner configuration settings from the master scanner.

11. The method of claim 10, wherein polling scanners connected to the network to identify the master scanner includes:
transmitting a request to identify a master scanner of a scanner group based on data representative of at least one property of the scanner, components present in the scanner, and a system to which the scanner is coupled.

12. The method of claim 9, wherein receiving scanner configuration settings includes receiving a configuration setting for a component integrated within the scanner.

13. A scanner comprising:
a communication interface device;
at least one configurable component;
at least one data processing device;
at least one memory device on which scanner configuration settings and instructions executable by the at least one data processing device are stored, the instructions executable by the at least one data processing device to:
determine, during a scanner initialization process, that the configuration settings are to be updated in response to connection of the scanner to a network based on a missing value or state of one or more configuration settings of the scanner expressly indicating the un-configured state;
in response to determining that the configuration settings are to be updated, automatically request and receive scanner configuration settings from at least one device via the communication interface device including:
requesting data representative of scanner configuration settings from a at least two other scanners connected to a network to which the network interface device is coupled;
receiving data representative of configuration settings from the at least two other scanners;
analyze the received data representative of configuration settings to determine the configuration settings for the scanner;
store, on the at least one memory device, the determined configuration settings for the scanner; and
implement the determined scanner configuration settings on the scanner.

14. The scanner of claim 13, wherein the at least one configurable component includes a scale and at least one scanning device.

15. The scanner of claim 13, wherein the data processing device is a firmware device that includes the at least one memory therein.

16. The scanner of claim 13, wherein implementing the scanner configuration settings includes restarting the scanner initialization process.

17. The scanner of claim 13, wherein requesting scanner configuration settings from at least device includes:
polling other scanners connected to a network to which the network interface device is coupled to identify a master scanner; and
upon identification of the master scanner, requesting, via the network interface device, the scanner configuration settings from the master scanner.

* * * * *